US008626885B2

(12) United States Patent
Deslandes et al.

(10) Patent No.: US 8,626,885 B2
(45) Date of Patent: *Jan. 7, 2014

(54) PROCESS FOR MONITORING THE CONSUMPTIONS OF FRANKING MACHINES

(75) Inventors: Thierry Deslandes, Clamart (FR); Marc Lecarpentier, Antony (FR)

(73) Assignee: Neopost Industrie, Bagneux (FR)

( * ) Notice: Subject to any disclaimer, the term of this patent is extended or adjusted under 35 U.S.C. 154(b) by 1345 days.

This patent is subject to a terminal disclaimer.

(21) Appl. No.: 10/376,226

(22) Filed: Mar. 3, 2003

(65) Prior Publication Data

US 2003/0131103 A1 Jul. 10, 2003

Related U.S. Application Data

(63) Continuation of application No. 09/392,585, filed on Sep. 9, 1999, now Pat. No. 6,868,443.

(30) Foreign Application Priority Data

Sep. 11, 1998 (FR) .................................... 98 11373

(51) Int. Cl.
*G06F 15/173* (2006.01)

(52) U.S. Cl.
USPC ............................ 709/223; 709/224; 705/404

(58) Field of Classification Search
USPC .......... 709/223, 224, 227, 229; 713/201, 153, 713/155, 184; 705/401, 403, 60, 61, 62
See application file for complete search history.

(56) References Cited

U.S. PATENT DOCUMENTS

| | | | | |
|---|---|---|---|---|
| 3,792,446 | A | 2/1974 | McFiggins et al. | |
| 4,097,923 | A | 6/1978 | Eckert et al. | |
| 4,752,950 | A * | 6/1988 | Le Carpentier | 379/106.11 |
| 4,760,532 | A | 7/1988 | Sansone et al. | |
| 4,783,745 | A | 11/1988 | Brookner et al. | |
| 4,787,045 | A | 11/1988 | Storace et al. | |
| 4,812,965 | A | 3/1989 | Taylor | |
| 4,812,994 | A | 3/1989 | Taylor et al. | |

(Continued)

FOREIGN PATENT DOCUMENTS

| | | | |
|---|---|---|---|
| EP | 0 376 573 | A2 | 7/1990 |
| EP | 0 388 843 | A2 | 9/1990 |
| EP | 0 475 780 | A2 | 3/1992 |

OTHER PUBLICATIONS

Little et al., Constructing Reliable Web Applications Using Atomic Actions, Mar. 1997.

(Continued)

*Primary Examiner* — Peling Shaw
(74) *Attorney, Agent, or Firm* — Sughrue Mion, PLLC

(57) ABSTRACT

According to the process for monitoring the consumptions of a plurality of franking machines through a public communication network, at least one franking machine not being connected to this network, a link is firstly established with a management server, through the public network, by means of at least one supervision terminal independent of the off-line franking machine, in accordance with a determined protocol of communication, and data is then exchanged between the terminal and the server during which the user inputs at the supervision terminal a current invoicing index relative to the off-line franking machine and receives in return a code of authorization to frank in order to validate the subsequent frankings of the off-line franking machine.

2 Claims, 2 Drawing Sheets

(56) References Cited

U.S. PATENT DOCUMENTS

| | | | | | |
|---|---|---|---|---|---|
| 4,831,555 | A | | 5/1989 | Sansone et al. | |
| 4,837,701 | A | | 6/1989 | Sansone et al. | |
| 4,853,864 | A | | 8/1989 | Hart et al. | |
| 4,908,770 | A | * | 3/1990 | Breault et al. | 705/404 |
| 5,202,834 | A | | 4/1993 | Gilham | |
| 5,224,046 | A | * | 6/1993 | Kim et al. | 705/403 |
| 5,237,506 | A | | 8/1993 | Horbal et al. | |
| 5,323,323 | A | | 6/1994 | Gilham | |
| 5,340,965 | A | | 8/1994 | Horbal et al. | |
| 5,367,464 | A | | 11/1994 | Abumehdi et al. | |
| 5,485,370 | A | | 1/1996 | Moss et al. | |
| 5,526,271 | A | | 6/1996 | Abumehdi | |
| 5,570,290 | A | | 10/1996 | Foschi | |
| 5,657,689 | A | | 8/1997 | Lee | |
| 5,680,615 | A | | 10/1997 | Marlin et al. | |
| 5,701,250 | A | | 12/1997 | Wilson | |
| 5,715,164 | A | | 2/1998 | Liechti et al. | |
| 5,717,596 | A | | 2/1998 | Bernard et al. | |
| 5,778,377 | A | | 7/1998 | Marlin et al. | |
| 5,796,633 | A | | 8/1998 | Burgess et al. | |
| 5,802,146 | A | | 9/1998 | Dulman | |
| 5,812,666 | A | | 9/1998 | Baker et al. | |
| 5,822,739 | A | | 10/1998 | Kara | |
| 5,841,117 | A | | 11/1998 | Pauly | |
| 5,878,138 | A | | 3/1999 | Yacobi | |
| 5,884,292 | A | | 3/1999 | Baker et al. | |
| 5,909,373 | A | | 6/1999 | Samsone et al. | |
| 5,918,217 | A | | 6/1999 | Maggioncalda et al. | |
| 5,918,220 | A | | 6/1999 | Sansone et al. | |
| 5,937,396 | A | | 8/1999 | Konya | |
| 5,956,391 | A | | 9/1999 | Melen et al. | |
| 5,970,150 | A | | 10/1999 | Sansone | |
| 5,987,441 | A | | 11/1999 | Lee et al. | |
| 5,991,409 | A | | 11/1999 | Windel et al. | |
| 5,991,746 | A | | 11/1999 | Wang | |
| 6,005,945 | A | | 12/1999 | Whitehouse | |
| 6,009,417 | A | | 12/1999 | Brookner et al. | |
| 6,010,069 | A | | 1/2000 | Debois | |
| 6,019,281 | A | | 2/2000 | Emmett et al. | |
| 6,026,385 | A | | 2/2000 | Harvey et al. | |
| 6,029,151 | A | | 2/2000 | Nikander | |
| 6,038,553 | A | | 3/2000 | Hyde, Jr. | |
| 6,047,051 | A | | 4/2000 | Ginzboorg et al. | |
| 6,047,273 | A | | 4/2000 | Vaghi | |
| 6,058,193 | A | | 5/2000 | Cordery et al. | |
| 6,061,670 | A | | 5/2000 | Brand | |
| 6,081,795 | A | | 6/2000 | Ryan, Jr. | |
| 6,085,181 | A | | 7/2000 | Gravell et al. | |
| 6,098,032 | A | | 8/2000 | Brookner | |
| 6,098,058 | A | | 8/2000 | Gravell et al. | |
| 6,101,487 | A | | 8/2000 | Yeung | |
| 6,148,292 | A | | 11/2000 | Reisinger et al. | |
| 6,151,590 | A | * | 11/2000 | Cordery et al. | 705/60 |
| 6,151,591 | A | | 11/2000 | Pierce et al. | |
| 6,227,445 | B1 | | 5/2001 | Brookner | |
| 6,240,403 | B1 | | 5/2001 | Shah et al. | |
| 6,249,777 | B1 | | 6/2001 | Kara et al. | |
| 6,249,818 | B1 | | 6/2001 | Sharma | |
| 6,359,881 | B1 | * | 3/2002 | Gerszberg et al. | 370/354 |
| 6,385,731 | B2 | | 5/2002 | Ananda | |
| 6,442,571 | B1 | | 8/2002 | Haff et al. | |
| 6,466,921 | B1 | | 10/2002 | Cordery et al. | |
| 6,618,709 | B1 | * | 9/2003 | Sneeringer | 705/412 |

OTHER PUBLICATIONS

Pierce et al, Nov. 1995. Scaleable, Secure Cash Payment for WWW Resources with the PayMe Protocol Set, Nov. 1995.

* cited by examiner

PROCESS FOR MONITORING THE CONSUMPTIONS OF FRANKING MACHINES

CROSS-REFERENCE TO RELATED APPLICATIONS

This is a continuation of application Ser. No. 09/392,585 filed Sep. 9, 1999 now U.S. Pat. No. 6,868,443, the disclosure of which is incorporated herein by reference in its entirety.

FIELD OF THE INVENTION

The present invention relates to the domain of the processing of mail and more particularly to a process for monitoring the consumption of franking machines.

BACKGROUND OF THE INVENTION

It is known that it is indispensable to monitor the consumption of franking machines, both by the user, who must note daily the value of the reversible meter (also called invoicing index) in order to fill in a daily consumption statement generally addressed monthly to the Postal Service, and by an officer of this administration who must come in situ to check the veracity of this index with respect to the statements received.

However, this statement becomes particularly delicate when managing a large set of franking machines.

It is known, in particular by Patent EP 0 208 231, to eliminate these manual statements by connecting the franking machine, through the telephone network, to a specialized data-processing server managed by the Postal Service or the dealer of this franking machine. For example, the administration or the dealer being constantly informed of the indexes of the different machines, the user no longer has to fill in daily consumption statements and it is no longer necessary for an officer of this administration to come in situ to check the exactitude thereof. In addition, such permanent connection generally allows a remote "refill" of the franking amount authorized.

However, such a link to a server does not enable the user to have an overall or even local picture of the management of his set and, in particular, it is not possible for him to know, at a given instant, the state of the indexes of the different machines without reading them at the level of each machine as the state of the corresponding statistics. In addition, such an outside connection to a distant server is possible only with modern electronic franking machines. Now, more than 100,000 traditional electromechanical franking machines exist at the present time, on the French territory alone, which do not present this possibility of connection to a remote data-processing server.

It is an essential object of the present invention to provide a process for monitoring the consumptions of franking machines, particularly adapted to the management of an assorted set of machines and which does not necessitate a direct link with a data-processing server. One purpose of the invention is to propose a process for monitoring the consumptions of a set of franking machines which is both supple and simple to use while allowing a coherent management for the user. Another purpose of the invention is to render secure the exchange of data with the Postal Service. A further object of the invention is to allow the Postal Service to track and monitor more precisely the franking operations effected by the user.

SUMMARY OF THE INVENTION

These objects are attained by a process for monitoring the consumptions of a plurality of franking machines through a public communication network, at least one franking machine not being connected to this network, characterized in that a link with a management server is firstly established through the public network, by means of at least one supervision terminal independent of the at least one offline franking machine, in accordance with a determined protocol of communication, and then data are exchanged between the terminal and the server during which the user inputs at the supervision terminal a current invoicing index relative to the at least one off-line franking machine and in return receives a code of authorization to frank in order to validate the subsequent frankings of the at least one off-line franking machine. The protocol of communication used for establishing a link with the remote server is either a Videotex protocol, for example the teletel protocol, or a protocol of TCP/IP type.

Solely by this dialogue of the user with a Videotext or Internet server of the Postal Service or of the dealer, without passing through the franking machine, it is thus possible to ensure a perfectly coherent and simple management of a set of assorted franking machines; in addition, a stricter surveillance of the postal traffic including a more strict monitoring of the index entered by the user is obtained, as well as an improved security of the data exchanges.

The data exchange step comprises a step of inputting by the user of an identifier including at least one password or personal identification number and a step of display, at the supervision terminal, on the one hand, of a list of the printing heads associated with said user's plurality of franking machines, and, on the other hand, for each printing head, of a last invoicing index validated by the server.

The code of authorization to frank advantageously comprises information relative to an authorized maximum amount of credit or consumption and period of franking. It is, obtained by calculation from, the current invoicing index and/or the serial number of a printing head, which provides an easy and automatic monitoring of the index introduced by the user, making it unnecessary for an officer of the postal service to come in situ for checking purposes.

The invention is taught below by way of various specific exemplary embodiments explained in detail, and illustrated in the enclosed drawing figures.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENT

Figure 1:
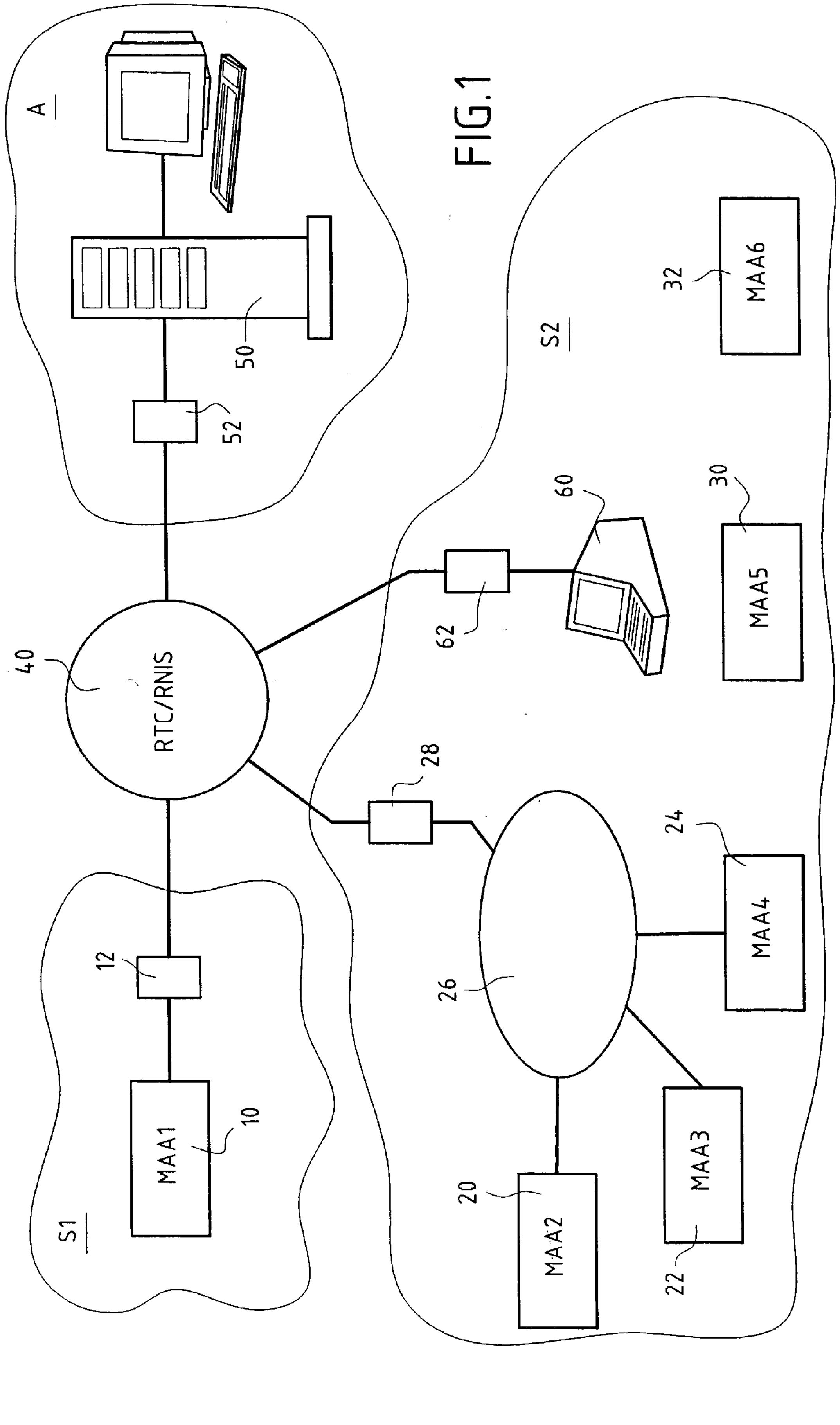
FIG. 1 illustrates an example of configuration of a set of franking machines.

Referring now to the drawings, an example of configuration of a user's set of franking machines is shown in FIG. 1. This set is located for example at two different production sites. On a first site S1, a single franking machine of electronic type is available, connected by a modem 12 to a public communication network, for example the switched telephone network or a numeric network (PSTN/ISDN 40). On a second site S2, distinct from the first, five franking machines, three of electronic type and two traditional electromechanical machines, are available. The electronic machines 20, 22, 24 are for example connected to an internal network 26 which presents a common access to the public network 40 via a modem 28, while the two traditional machines 30, 32 are, on the contrary, isolated from this network and operate independently.

The user's different franking machines are under the surveillance of a dataprocessing server charged with managing the set of the franking machines and disposed at a distance from these production sites in premises A of the Postal Service or at the machine dealer's. This server 50 is conventionally connected by a communication means to a network (of the type PSTN/ISDN/X25), for example via a modem 52 to the public network 40.

Figure 2:
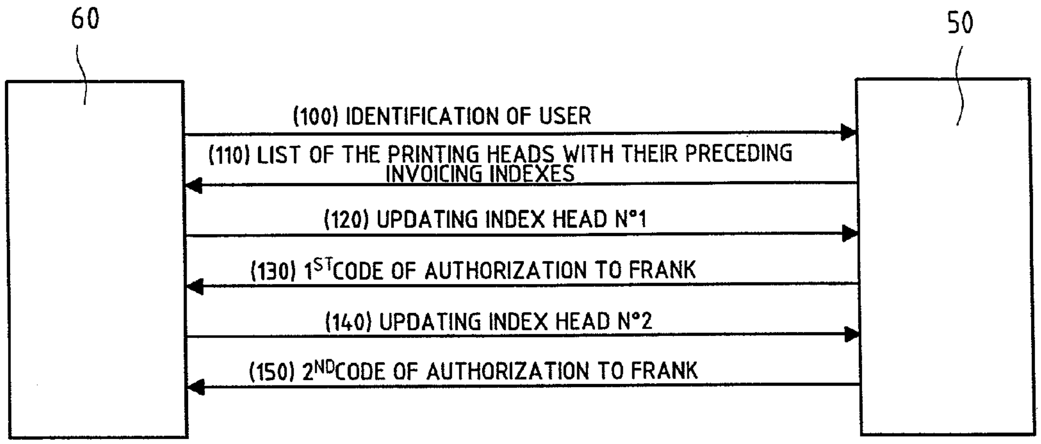
FIG. 2 explains the process according to the invention governing the exchanges between a terminal and a remote server.

According to the invention, at least one supervision terminal 60 is provided, connected to the public network by a modem 62 (which is preferably integrated in the terminal) and ensuring for the user the acquisition and display of data necessary for the management of his set of franking machines. This terminal is advantageously located on a production site near the traditional machines not having a link to the public network. Of course, a plurality of terminals having access to the same data may be disposed on the same site or on different sites depending on the user's needs. The terminal is placed in relation with the server by means of a videotex protocol (for example the protocol known under the name of "Teletel") or by a so-called TCP/IP protocol through an Internet explorer (browser) and in accordance with a specific process. As illustrated in FIG. 1, a number of the franking machines (for example machines 10, 20, 22, and 24) are independent of the supervision terminal 60. FIG. 2, which shows the different steps of placing the terminal 60 of the user's set of franking machines in relation with the server 50 of the Postal Service (or of the dealer of these machines), will now be explained.

After having made the connection with the server (connection to the 10 "Minitel" service or to the Internet site of the server), a welcome page appears on the screen of the terminal. In a first step 100, the user is invited to enter via the keyboard of the terminal his identifier which may consist of a customer's name or a password or a personal identification number (PIN). If these references are correct, the server displays at the terminal, in a following step 110, the complete list of the printing heads (electronic and traditional) in the user's possession (on all these sites or possibly on a given site if the user so requests) with, for each of them, both the last index of invoicing previously validated by the server and the current index (the preceding input) with its corresponding date of input. If said references are not correct, the user is invited to renew his identification (it will be noted that, in the event of repeated failures, the connection to the server is automatically interrupted and a call to the After-Sales Service is then necessary in order to re-establish the service). Step 110 may also optionally comprise a step of display at the supervision terminal of a selectable plurality of tables and/or statistics in graph form relating to this list of printing heads.

In a step 120, the user selects a first traditional printing head of which he wishes to update the index and enters via the keyboard of the terminal the new current index. The server verifies that this index is greater than the last index validated, i.e. the last index taken into account to establish an invoicing by the postal service (in default, an error message is issued) and then displays, in a new step 130, the new current index with its date and time of modification as well as a first number of authorization to frank associated with the printing head selected. This number is conventionally obtained by a calculation from known data such as for example, without these data being limiting, the serial number of the printing head and the current invoicing index. The number of authorization to frank may also be obtained by calculation from, in particular, the current date and/or from, in particular, information relative to a maximum amount of credit or of consumption authorized and/or to a period of franking authorized.

In a step 140, the user may then renew the preceding operations for a second printing head selected, the server addressing a second code of authorization to frank for this second head in an ultimate step 150. If no other selection is made, the exchange is terminated and the user may then interrupt the link himself. The different codes of authorization to frank may then be introduced manually by the user at the level of the franking machines provided with the corresponding printing heads.

Contrarily to the establishment of the statements of daily consumption which necessitated readings every day, the link with the server does not have to be daily, but only at a periodicity defined previously with the Postal Service. In effect, when a service contract is made between the administration (or the dealer of the franking machine) and the user, relating to the management of his set by means of supervision terminals, this user is fixed both a predetermined financial limit (for example between 1,000 and 50,000 frs) variable as a function of his foreseeable or possibly known solvability or of his reliability, for example in paying his previous invoices, and a time limit (selected for example from the following periods: a fortnight, a month, three months and six months) variable as a function in particular of the total franking envisaged and at the close of which the user must be connected at least once to the server. These two limits which may be modified during the contract, for example upon a simple decision of the postal service, are then communicated with the code of authorization to frank of which they may constitute for example the last three characters (two characters being able to correspond to the maximum amount of franking authorized, from 1 to 99, one character being associated with the period of franking authorized) and thus be in a position to be communicated to the franking machine.

It will have been noted that the inputting of the indexes is, of course, valid only for traditional machines, the indexes of the other heads not being modifiable in this manner. However, by displaying the indexes of all the printing heads, it is possible to give the user a complete picture of his set of franking machines and therefore to be able to inform him at any moment of the state thereof, the preceding and current indexes of the electronic machines being in fact sent in known manner once a day directly to the server by the permanent links existing between the franking machines and the server.

Figure 3:
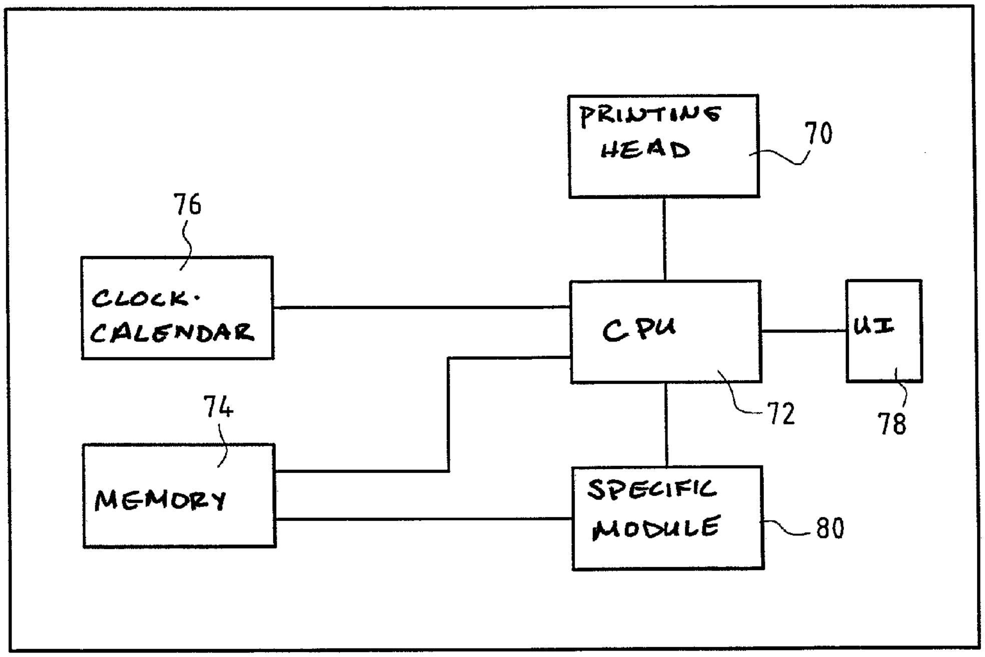
FIG. 3 shows a franking machine for carrying out the process of FIG. 2.

The structure of the franking machine for carrying out the process according to the invention is illustrated in FIG. 3. In addition to the conventional devices (not shown) concerning the entry, the conveying and the positioning of the postal items with a view to printing the postal indicia, it comprises a printing head 70 for ensuring this printing under the control of a central processing unit 72 conventionally comprising means for memorizing programmes and data. A non-volatile memory 74 is further provided to receive the postal data and in particular the content of the reversible meters which are preferably memorized as a function of date (and hour) data furnished by a clockcalender 76. A user interface 78 provided with a keyboard and a display means, for example of the liquid crystal type, is also available at the level of the franking machine to allow the acquisition of diverse data necessary for franking (for example the nature of the carrier or category of dispatch and possibly weight of the article to be mailed in the absence of automatic weighing) and the display of multiple information for the user (verification of the inputs for example) and in particular the invoicing index.

According to the invention, there is added to each franking machine a specific module 80, which may be software and in that case integrated in the program memory of the processing unit, intended for calculating the code of authorization to frank in accordance with a process of calculation similar to the one followed by the server and for ensuring blocking of the franking machine when, on the one hand, this calculated code is different from that furnished by the server and then communicated manually by the user to the franking machine (through his user interface) and, on the other hand, when the user has not respected certain operating conditions imposed by the Postal Service and in particular when he has exceeded the authorizations allowed by this service as to the amount or period of franking authorized (it will be noted that the period may be monitored very simply with the aid of the clock-calendar).

By this system, the user is obliged to dialogue regularly with the server in order to avoid a blockage of his machines. In addition, as, after each connection, a calculation of the code of authorization to frank is proceeded with, integrating in particular the current index acquired by the user, frauds on this index are eliminated as, upon inputting this code on the franking machine, any error will block the machine. A stricter surveillance of the postal traffic is also obtained, as well as a better security of the exchange of information.

If the set of franking machines comprises only machines linked to the network, the input of the identifier including at least one password or personal identification number will show on the display screen of the supervision terminal used a menu allowing the user to input new invoicing indexes relative to all these machines, or to consult the state of all the machines of the set with the last respective indexes validated by the server as state of the various statistical data defining this set, able to be parametered, locally or globally, in the form of tables and graphic representations in particular.

The usual ratios relative to the valid heads, the incidents and the consumptions of all the machines of a site may thus be easily produced.

The invention thus covers a process for monitoring the consumptions of a plurality of franking machines through a public communication network, in which a link is firstly established with a management server, by means of at least one supervision terminal independent of this plurality of machines, in accordance with a determined protocol of communication, and an exchange of data is then proceeded with between the terminal and the server during which the user inputs at the supervision terminal an identifier including at least one password or a personal identification number, and receives in return the possibility of selecting in a display menu of said terminal, the inputting of new indexes or the display of the last indexes validated by the server such as statistical data relating to said plurality of franking machines.

A variant of the process according to the invention consists in being connected to the server via a telephone set with integrated display and a telephone communication line of the vocal synthesis type.

What is claimed is:

1. A franking system, comprising:

a plurality of franking machines capable of communicating through a public communications network, with a management server, to send invoice indexes, each franking machine of said plurality of franking machines sending an invoice index indicative of franking performed by itself; and a supervision terminal adapted to communicate, through the public communications network, with the management server, the supervision terminal being never in communication with the plurality of franking machines;

wherein:

the supervision terminal is adapted to send at least one of a password and a personal identification number, through the public communications network to the management server; and the supervision terminal is adapted to receive statistical data from the management server, through the public communications network, said statistical data comprising at least invoicing indexes indicative of franking performed by all of the plurality of franking machines and previously sent to the management server by each of the plurality of franking machines.

2. The franking system of claim 1, wherein the supervision terminal outputs the statistical data to a display.

* * * * *